No. 849,564. PATENTED APR. 9, 1907.
C. M. OVERCASH.
COFFEE POT.
APPLICATION FILED JUNE 8, 1906.

Witnesses
Inventor
C. M. Overcash
By
Attorneys

UNITED STATES PATENT OFFICE.

CHARLES M. OVERCASH, OF CONCORD, NORTH CAROLINA.

COFFEE-POT.

No. 849,564.  Specification of Letters Patent.  Patented April 9, 1907.

Application filed June 8, 1906. Serial No. 320,829.

*To all whom it may concern:*

Be it known that I, CHARLES M. OVERCASH, a citizen of the United States, residing at Concord, in the county of Cabarrus, State of North Carolina, have invented certain new and useful Improvements in Coffee-Pots; and I do hereby declare the following to be a full, clear, and exact description of the invention, such as will enable others skilled in the art to which it appertains to make and use the same.

This invention has reference to coffee-pots and the like, its object being to provide a device for use with such articles by means of which all escape of steam is prevented, and the valuable properties contained in the substance under treatment are retained instead of being free to escape with the steam, as heretofore possible.

A further object is to provide means for preventing the entrance of any dirt or dust into the coffee-pot or other receptacle through its spout.

With these ends in view the essential features of the invention comprise a plate secured to the spout of the coffee-pot and carrying a bent rod, one end of which has secured thereto a cap for closing the spout, while the opposite end thereof is weighted.

The invention will be readily understood from a consideration of the following detailed description, taken in connection with the accompanying drawings, in which—

Figure 1:
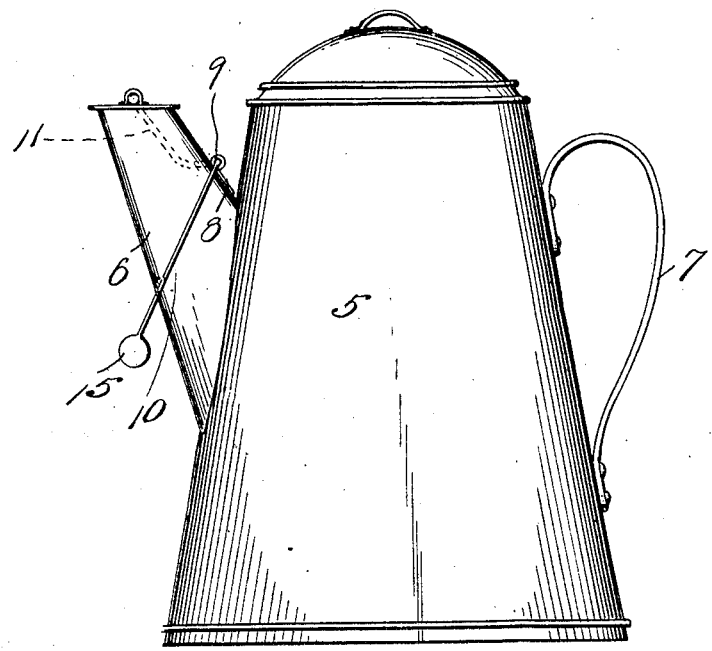
Figure 2:
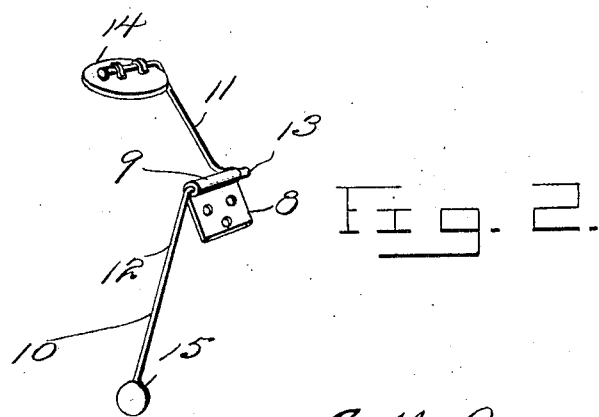

Figure 1 is a side elevation of a coffee-pot provided with a protecting device constructed in accordance with this invention. Fig. 2 is a perspective view of such device removed therefrom.

Like parts are designated by corresponding numerals in the several views.

Referring to the drawings, 5 designates generally a coffee-pot or the like of any preferred description provided with the usual spout 6 and handle 7. Secured to said spout is a metal plate 8, the upper end of which is bent to form a beaded portion 9, disposed transversely of the spout. Pivotally mounted within said plate is a rod 10, bent to form an upper arm 11, a lower arm 12, and a connecting-section 13, the last-mentioned part being, as stated, pivotally mounted in said bead. The free end of the upper arm is provided with a cap 14, pivoted thereto, and the free end of the lower arm is weighted, as at 15, the upper and lower arms being arranged on opposite sides of the spout and extending in opposite directions, as shown.

It will be readily understood from the above that when the pot is charged with the substance to be treated and is in its normal position the cap 14 will close the spout, owing to the action of the weighted lower arm. It will thus be impossible for any dirt or dust to enter into the pot through its spout, and at the same time the escape of steam will be prevented unless the pressure within the pot is excessive. When, however, the pot is tilted from its normal position, the weighted arm will have a corresponding swinging movement and will elevate the upper arm 11, raising the cap from its position upon the spout-mouth.

I am aware that it is old to provide a spout-cap with a pair of arms arranged on opposite sides of the spout and which will tend to normally close the spout-mouth, and I do not, therefore, claim such construction. It is, however, new to effect the movement of the spout-cap by means of a single bent rod carried in the beaded portion of a plate secured to the spout.

What is claimed is—

1. The combination in a coffee-pot or the like, of a hinge secured to the spout thereof; a rod pivotally mounted in said hinge and bent to form an upper and a lower arm and a connecting-section, said arms being disposed on opposite sides of said spout; a cap attached to said upper arm for closing said spout; and a weight carried by said lower arm.

2. The combination in a coffee-pot or the like, of a plate secured to the spout thereof and formed with a bead disposed transversely of said spout; a rod comprising an upper and a lower arm and a connecting-section, said connecting-section being pivotally mounted in said bead, and said arms being disposed on opposite sides of said spout; a cap attached to said upper arm for closing said spout; and a weight carried by said lower arm.

In testimony whereof I affix my signature in presence of two witnesses.

CHAS. M. OVERCASH.

Witnesses:
JNO. WADSWORTH,
WILLIAM B. MORRISON.